P. DODOKIN.
INDICATOR FOR GASOLENE TANKS.
APPLICATION FILED APR. 6, 1915.
1,162,686.
Patented Nov. 30, 1915.
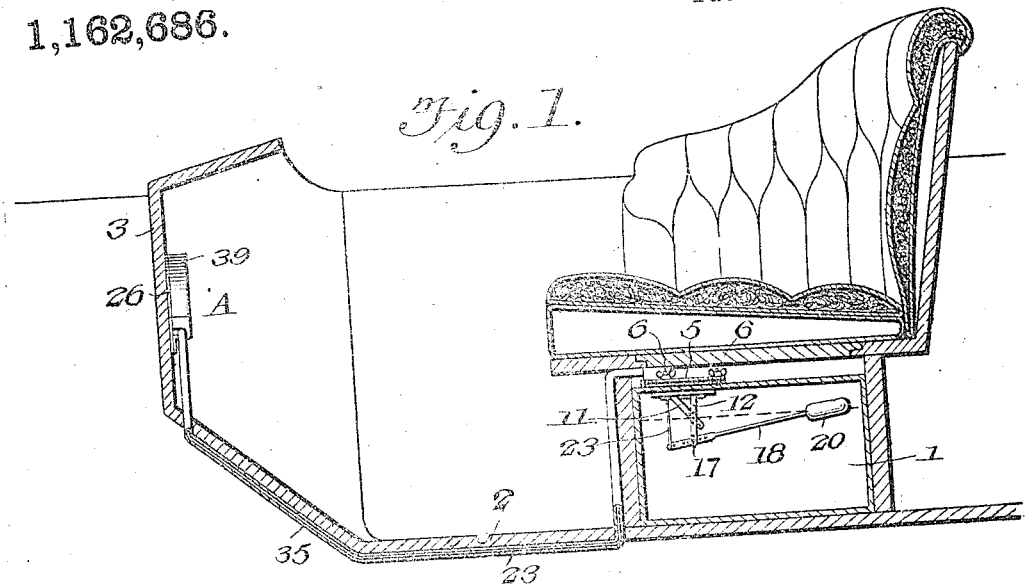
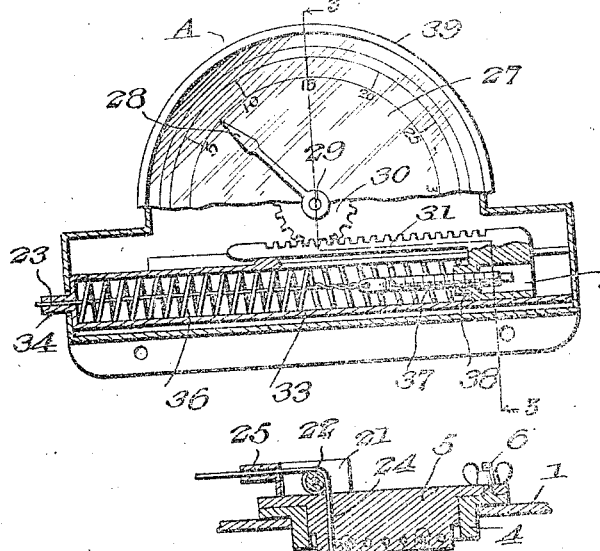
Inventor
Paul Dodokin
Victor J. Evans
Attorney
Witnesses

UNITED STATES PATENT OFFICE.

PAUL DODOKIN, OF LANGBANK, SASKATCHEWAN, CANADA, ASSIGNOR OF ONE-HALF TO DANE M. SMITH, OF LANGBANK, SASKATCHEWAN, CANADA.

INDICATOR FOR GASOLENE-TANKS.

1,162,686.  Specification of Letters Patent.  Patented Nov. 30, 1915.

Application filed April 6, 1915. Serial No. 19,513.

*To all whom it may concern:*

Be it known that I, PAUL DODOKIN, a subject of the King of Great Britain, residing at Langbank, in the Province of Saskatchewan and Dominion of Canada, have invented new and useful Improvements in Indicators for Gasolene-Tanks, of which the following is a specification.

This invention relates to indicators for gasolene tanks, and the like, the object in view being to provide a fuel indicator always in plain view of the operator of an automobile, motor truck or the like, whereby the quantity of gasolene remaining in the supply tank may be instantly observed.

One of the principal objects of the present invention is to provide indicating apparatus for the purpose specified which will admit of adjustment to adapt the several parts of the apparatus to tanks of different depths and capacities and to the automobile upon which the apparatus is mounted, thereby providing for a more accurate gaging of the quantity of gasolene in the supply tank or reservoir.

With the above and other objects in view, the invention consists in the novel construction, combination and arrangement of parts, as herein described, illustrated and claimed.

In the accompanying drawings;—Figure 1 is a vertical section through the gasolene tank of an automobile, showing also the floor and dash of the machine and the application of the present invention thereto. Fig. 2 is a face view of the indicator partly broken away. Fig. 3 is a cross section through the same, taken on line 3—3 of Fig. 2. Fig. 4 is a detail perspective view of the runner and the rack bar. Fig. 5 is a detail view of the float lever and its support.

Referring to the drawings 1 designates a gasolene tank which is usually arranged under the seat of an automobile, 2 designates the floor of the machine and 3 the dash.

In carrying out the present invention a preferably circular opening is formed in the top of the tank and a flanged seat ring 4 is inserted therein and preferably fastened thereto permanently.

5 designates a flanged cap for closing the opening referred to, the main body of said cap being received in the seating ring and being held in place in relation thereto by suitable fasteners 6 shown in the form of screws provided with nuts preferably of the thumb or winged type so as to permit the cap to be readily removed together with the parts carried thereby.

The cap is provided on its under side with a diametrically extending rib 7 having longitudinal series of holes 8 to receive the pivots 9 and 10 of a pair of downwardly extending suspension arms 11 and 12 which are in turn provided with longitudinal series of holes 13 and 14 to receive a connecting pin or bolt 16 the purpose of which will presently appear. Pivotally connected by a removable pin or bolt 17 to the lower extremity of one of said arms is a float lever 18 having a longitudinal series of holes 19 through any one of which the bolt or pin 17 may pass to give the necessary throw to the arm for operating the indicator in accordance with the level of the gasolene or other liquid in the tank 1. At the extremity of the longer arm of the lever 18 is a float 20 which moves upwardly and downwardly in accordance with the level of gasolene in the tank. It will now be understood that the adjustment of the float lever supporting arms in relation to each other and to the rib of the under side of the cap enables the float and its lever to be adjusted in accordance with the depth or capacity of the tank in connection with which the indicating apparatus is employed.

On the upper side of the cap there is a small housing 21 in which is journaled a grooved guide roller 22 for a flexible operative connection 23 shown in the form of a wire or small coupling one end of which is attached to the shorter arm of the float lever, said flexible connection passing from said lever upwardly through an opening 24 in the cap and out through a tubular guide 25 extending off from said roller housing.

The indicator designated generally at A comprises a substantially semi-circular casing 26 provided at the front thereof with a dial 27 having an arcuate series of graduations which may be numbered consecutively to represent gallons or inches or any other measurements. Arranged to sweep over the dial 27 is an indicating pointer 28 the shaft 29 of which extends through the dial and is journaled in bearings in the casing as shown and provided with a toothed gear 30 the teeth of which are described on an arc of which the shaft 29 is the center. Meshing with and actuating said gear 30 is a rack bar 31. This rack bar is connected at one end to and preferably formed integrally with a runner 32 preferably in the form of a hollow cylinder, the same being movable longitudinally within a tubular guide 33 of corresponding shape in cross section, said guide being attached to and forming a part of the casing of the indicator. The guide 33 is open at one end to receive the runner 32 and the other end thereof is closed with the exception of a small opening or nipple 34 to receive the flexible connecting member 23 above referred to. Between the indicator casing and the tank or reservoir 1, the flexible connection 23 preferably passes through a guide tube 35.

Interposed between the runner 32 and the closed end of the tubular guide 33 is a helical expansion spring 36 the tension of which is exerted to produce a pull on the flexible connection 23. Said connection 23 is attached to the adjacent end of a threaded stem 37 which extends into and through a threaded opening 38 in the adjacent end of the runner 32. At its outer end, the adjusting screw is provided with a squared end or a mechanical equivalent thereof to enable said stem to be turned by means of a key or the like for the purpose of advancing or retracting the runner and its rack bar 31 in order to set the indicating pointer 28 at zero when the tank is empty. This further adapts the device to tanks of varying depths and capacity.

The indicator casing also comprises a detachable section 39 forming a cover for the dial, the same being provided with a glass panel through which the dial and indicating pointer may be observed. The lower portion of the casing section 39 is so constructed as to fit over and inclose the tubular guide 33 and is formed at one end with a notch to receive the nipple 34 and closed at its opposite end to form a stop wall to limit the movement of the runner 32 and the rack bar 31 as said runner is pressed in that direction by the expansion of the helical spring above referred to.

From the foregoing description taken in connection with the accompanying drawings, it will now be understood that as the level of the gasolene falls in the tank 1, the shorter arm of the float lever rises and permits the runner actuating spring to expand, thereby moving the rack bar 31 in a direction to retract the indicating pointer until it reaches zero when the supply of gasolene in the tank is consumed. In this way the operator at a glance may ascertain when he is about to run out of gasolene and act accordingly.

What I claim is:—

1. The combination of a tank, a float therein, an indicator casing comprising a dial, a pivoted pointer working in conjunction with said dial, a toothed gear on said pointer the teeth of which are in an arc of which the pivot of said pointer is the center, a runner guided in and by said casing, a rack bar carried by said runner and engaging said gear, an adjusting stem threaded in said runner, an operating connection between said stem and float, and a spring for pressing said runner in opposition to the force applied thereto by said operating connection.

2. The combination of a tank, a float therein, an indicator casing comprising a dial, a pivoted pointer working in conjunction with said dial, a toothed gear on said pointer the teeth of which are in an arc of which the pivot of said pointer is the center, a runner guided in and by said casing, a spring resisting the movement of said runner in one direction, a rack bar carried by said runner and engaging said gear, an adjusting stem threaded in said runner, an operating connection between said stem and float, and means for turning said stem to advance or retract said runner and rack bar.

In testimony whereof I affix my signature in presence of two witnesses.

PAUL DODOKIN.

Witnesses:
M. J. DERMODY,
O. W. DACK.